United States Patent
Magee et al.

(10) Patent No.: US 9,825,564 B2
(45) Date of Patent: Nov. 21, 2017

(54) CIRCUITS AND METHODS OF DETERMINING POSITION AND VELOCITY OF A ROTOR

(71) Applicant: TEXAS INSTRUMENTS INCORPORATED, Dallas, TX (US)

(72) Inventors: David P. Magee, Allen, TX (US); Shih-Chin Yang, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/000,103

(22) Filed: Jan. 19, 2016

(65) Prior Publication Data
US 2016/0134216 A1 May 12, 2016

Related U.S. Application Data

(62) Division of application No. 14/245,206, filed on Apr. 4, 2014, now Pat. No. 9,270,220.

(60) Provisional application No. 61/819,267, filed on May 3, 2013.

(51) Int. Cl.
| | |
|---|---|
| H02K 29/06 | (2006.01) |
| H02P 6/18 | (2016.01) |
| H02P 21/24 | (2016.01) |
| H02P 21/13 | (2006.01) |
| H02P 6/185 | (2016.01) |
| H02P 21/32 | (2016.01) |

(52) U.S. Cl.
CPC ............ *H02P 6/183* (2013.01); *H02P 6/18* (2013.01); *H02P 6/181* (2013.01); *H02P 6/185* (2013.01); *H02P 21/13* (2013.01); *H02P 21/24* (2016.02); *H02P 21/32* (2016.02)

(58) Field of Classification Search
CPC .......... H02P 6/183; H02P 21/24; H02P 21/32; H02P 6/18
USPC .................................................. 318/400.32
See application file for complete search history.

(56) References Cited

U.S. PATENT DOCUMENTS

| | | | | |
|---|---|---|---|---|
| 5,565,752 | A * | 10/1996 | Jansen | H02K 17/165 310/169 |
| 6,163,127 | A * | 12/2000 | Patel | B60L 11/1803 318/700 |
| 2014/0210386 | A1* | 7/2014 | Zhao | H02P 21/36 318/400.02 |
| 2015/0084576 | A1* | 3/2015 | Magee | H02P 6/183 318/768 |
| 2017/0045055 | A1* | 2/2017 | Hoefel | F04D 1/06 |

* cited by examiner

*Primary Examiner* — Erick Glass
(74) *Attorney, Agent, or Firm* — Kenneth Liu; Charles A. Brill; Frank D. Cimino (57) ABSTRACT

A motor controller includes a square wave voltage generator and adding circuitry for adding the square wave voltage to a first drive voltage that is connectable to the stator windings of a motor. A current monitor for monitoring the input current to the motor as a result of the square wave voltage. A device for determining the position of the rotor based on the input current.

15 Claims, 5 Drawing Sheets

FIG. 9

CIRCUITS AND METHODS OF DETERMINING POSITION AND VELOCITY OF A ROTOR

CROSS REFERENCE TO RELATED APPLICATIONS

This patent application is a divisional application of U.S. patent application Ser. No. 14/245,206, filed Apr. 4, 2014, entitled "Circuits and Methods of Determining Position and Velocity of a Rotor," which claims priority to and the benefit of provisional patent application Ser. No. 61/819,267, filed May 3, 2013 entitled "Initial Position and Velocity Estimation Algorithm for Salient Permanent Magnet Motors," both of which are incorporated herein by reference.

BACKGROUND

A permanent magnet motor represents a type of motor where a fixed stator causes rotation of a movable rotor. The rotor typically includes multiple magnets embedded in or connected to the rotor, and the stator typically includes multiple conductive windings. Electrical current in the windings generates a rotating magnetic field that interacts with the magnets of the rotor, causing the rotor to rotate. Because the stator has multiple windings, the input to the stator, which is the input to the motor, is inductive.

"Sensorless" motor control refers to an approach where one or more characteristics of a motor, such as motor speed or rotor position, are mathematically derived. Sensorless motor control typically avoids the use of separate speed and position sensors that are mechanically attached to a motor.

SUMMARY

A motor controller includes a square wave voltage generator and adding circuitry for adding the square wave voltage to a first drive voltage that is connectable to the stator windings of a motor. A current monitor monitors the input current to the motor as a result of the square wave voltage. A device determines the position of the rotor based on the input current.

DETAILED DESCRIPTION

Sensorless drive systems and methods of driving salient motors and/or permanent magnet motors that overcome problems associated with conventional motor drivers are described herein. The systems and methods that are used vary slightly depending on the speed of the motor. When the motor is stationary, or more specifically, when the rotor is stationary relative to the stator, the position of the rotor is determined by injecting a square wave voltage into the motor and measuring the location or phase and direction of magnetic flux. The position of the rotor refers to the angle of the rotor and the terms "rotor position" and "rotor angle" are used synonymously. When the motor is operating at low speed, the rotor velocity is determined by injecting or superimposing a square wave onto a driving voltage of the motor and measuring the current into the motor. When the motor is operating at high speed, conventional systems and methods may be used to determine the position of the rotor.

Figure 1:
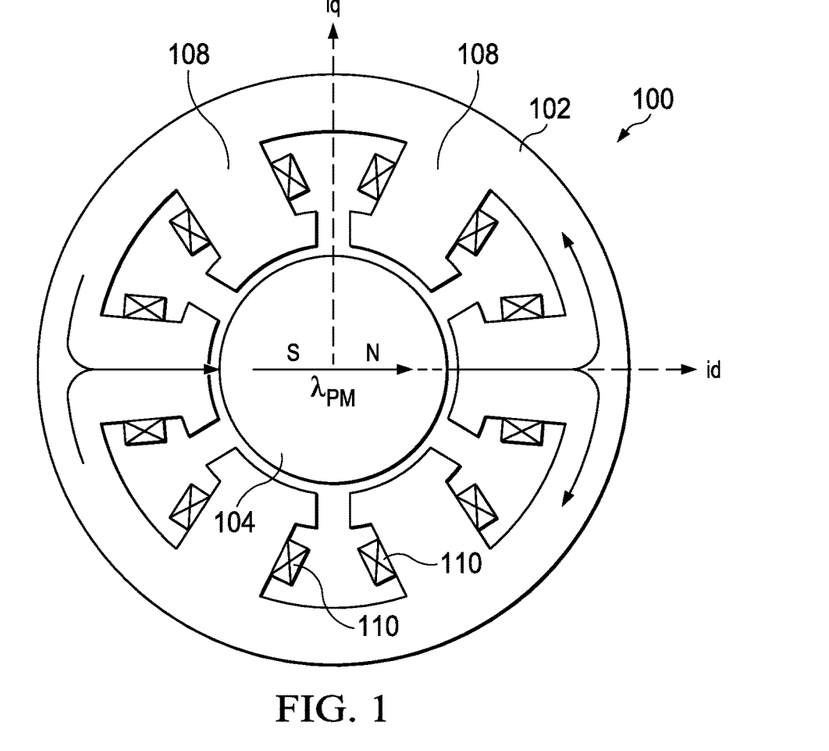
FIG. 1 is a cross sectional view of an embodiment of a permanent magnet motor.

A cross sectional view of a motor 100 is shown in FIG. 1. The motor 100 includes a stator 102 and a rotor 104. The stator 102 is fixed and the rotor 104 rotates relative to the stator 104. The stator 102 has a plurality of teeth 108 extending proximate the rotor 104. Each of the teeth 108 is wound by a conductor to form a coil or winding 110 that generates an electric field when current flows in the conductor. The rotor 104 has a single magnet or a plurality of magnets attached to it. In the embodiments described herein, the rotor 104 has a single magnet attached thereto or located therein. In the embodiment of FIG. 1, the magnet in the rotor 104 has orientation denoted by its north and south poles, N and S, respectively. The motor 100 operates by changing the electric fields in the windings 110, which causes the teeth 108 to push or pull on the magnet in the rotor 104, which in turn causes the rotor 104 to rotate. Therefore, by controlling the current input to the motor 100, which is input to the stator 102, the speed and torque of the motor 100 is controlled.

The maximum torque of the motor 100 is generated when the position or phase of the input current waveform to the windings 110 is perpendicular to the position of the flux waveform in the rotor 104. For permanent magnet motors, such as the motor 100, the flux position is equal to the position of the rotor 104. As a result, the maximum torque is achieved in the motor 100 if the instantaneous position of the rotor 104 is known so that the input current can be positioned accordingly. The current position refers to the phase of the input current in the windings 110 relative to the position of the rotor 104. By using the devices and methods disclosed herein, the position of the rotor 104 is quickly determined, which enables a motor controller (not shown in FIG. 1) to maximize the torque output of the motor 100.

Figure 2:
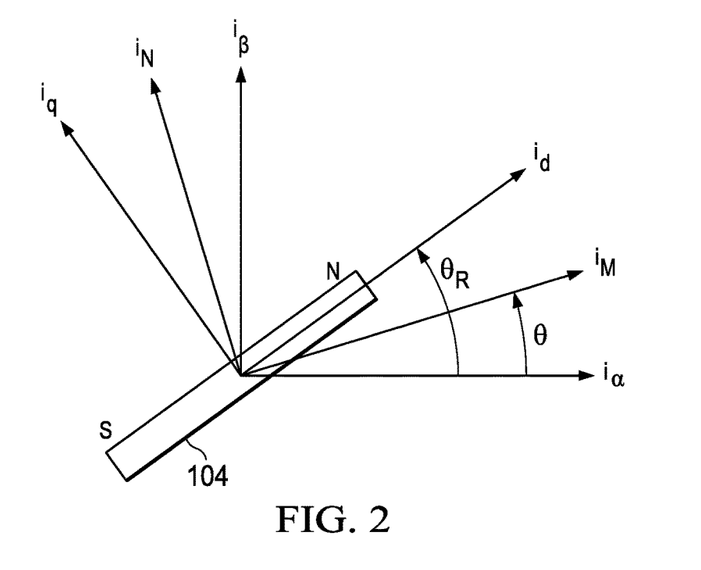
FIG. 2 is a diagram showing the rotor of FIG. 1 with different coordinate systems.

For reference purposes, a block diagram of the rotor 104 and different coordinate systems associated with the rotor 104 and the motor 100 are shown in FIG. 2. The coordinate systems are referenced according to currents associated with the stator 102, FIG. 1, which are referenced to the rotor 104. The currents $i_q$ and $i_d$ relate to the q-axis and the d-axis of the motor 100 and are fixed with respect to the rotor 104. The d/q-axes relate to torque control of the motor 100 and are orthogonal. The $i_M$-axis and $i_N$-axis are arbitrary axes that are used as references for determining the position of the rotor 104. The $i_M$ and $i_N$-axes may be predetermined axes in the motor 100 from which the position of the rotor 104 is determined. The $i_\alpha$-axis and the $i_\beta$-axis represent an orthogonal coordinate system where the $i_\alpha$-axis is aligned with the phase of a motor winding as described further below. The angle of the rotor 104 based on the angle between the $i_\alpha$-axis and the $i_M$-axis is referred to as the angle θ. A rotational angle $θ_R$ is defined as the angle between the $i_\alpha$-axis and the $i_d$-axis. As the rotor 104 rotates, the rotational angle $\theta_R$ changes wherein the change per unit time is equal to the velocity of the rotor 104.

Having described the motor 100, FIG. 1, the equations related to the operation of the motor 100 will now be described in order to determine the rotor position further below. The following equations relate to the motor 100 that has saliency, meaning that the inductances in the windings 110 change depending on the position of the rotor 104. More specifically, the magnet in the rotor 104 changes the inductance of the windings 110 as the position of the rotor 104, and the magnet located therein, change relative to the windings 110. The motor 100 is modeled by equation (1) as follows given that the motor 100 is salient or has saliency:

$$\begin{bmatrix} V_\alpha \\ V_\beta \end{bmatrix} = R_s \begin{bmatrix} i_\alpha \\ i_\beta \end{bmatrix} + \lambda_m \frac{d\theta_R}{dt} \begin{bmatrix} -\sin(\theta_R) \\ \cos(\theta_R) \end{bmatrix} + \quad \text{Equation (1)}$$

$$\begin{bmatrix} L_{LS} + \frac{3}{2}L_{0S} - \frac{3}{2}L_{2S}\sin(2\theta_R) \\ \frac{3}{2}L_{2S}\cos(2\theta_R) & L_{ls} + \frac{3}{2}L_{0S} + \\ -\frac{3}{2}L_{2S}\sin(2\theta_R) & \frac{3}{2}L_{2S}\cos(2\theta_R) \end{bmatrix} \begin{bmatrix} \frac{di_\alpha}{dt} \\ \frac{di_\beta}{dt} \end{bmatrix} +$$

$$\begin{bmatrix} -3L_{2S}\frac{d\theta_r}{dt}\sin(2\theta_R) & 3L_{2S}\frac{d\theta_R}{dt}\cos(2\theta_R) \\ 3L_{2S}\frac{d\theta_R}{dt}\cos(2\theta_R) & 3L_{2S}\frac{d\theta_R}{dt}\sin(2\theta_R) \end{bmatrix} \begin{bmatrix} i_\alpha \\ i_\beta \end{bmatrix}$$

where:

$V_\alpha, V_\beta$ are the stator voltages in the alpha/beta coordinate system;

$i_\alpha, i_\beta$ are the stator currents in the alpha/beta coordinate system;

$R_S$ is the stator resistance;

$\lambda_M$ is the magnetizing flux linkage;

$\theta_R$ is the electrical angle or rotor angle of the rotor 104;

$L_{LS}$ is the leakage inductance;

$L_{0S}$ is the $0^{th}$ order harmonic of the self-inductance;

$L_{2S}$ is the $2^{nd}$ order harmonic of the self-inductance; and $$\frac{d(\cdot)}{dt}$$

is the time rate of change of a given parameter.

Equation (1) describes the dynamics of the motor 100 in a static alpha/beta coordinate system with respect to the stator 102, meaning that the alpha/beta coordinate system is stationary relative to the rotor 104. The first term to the right of the equal sign is the voltage drop due to the stator resistance $R_S$, the second term is the voltage drop due to the back electromagnetic force of the motor 100, the third term is the voltage drop due to the total self-inductance, and the fourth term is the voltage drop due to the saliency of the motor 100.

In order to simplify equation (1), a common substitution is to let $L_0=L_{LS}+3/2L_{0S}$ and $\Delta L=3/2L_{2S}$ which yields equation (2) as follows:

$$\begin{bmatrix} V_\alpha \\ V_\beta \end{bmatrix} = R_S \begin{bmatrix} i_\alpha \\ i_\beta \end{bmatrix} + \lambda_M \frac{d\theta_r}{dt} \begin{bmatrix} -\sin(\theta_R) \\ \cos(\theta_R) \end{bmatrix} + \quad \text{Equation (2)}$$

$$\begin{bmatrix} L_0 - \Delta L\cos(2\theta_R) & -\Delta L\sin(2\theta_R) \\ -\Delta L\sin(2\theta_R) & L_0 + \Delta L\cos(2\theta_R) \end{bmatrix} \begin{bmatrix} \frac{di_\alpha}{dt} \\ \frac{di_\beta}{dt} \end{bmatrix} +$$

$$\begin{bmatrix} -2\Delta L\frac{d\theta_R}{dt}\sin(2\theta_R) & 2\Delta L\frac{d\theta_R}{dt}\cos(2\theta_R) \\ 2\Delta L\frac{d\theta_R}{dt}\cos(2\theta_R) & 2\Delta L\frac{d\theta_R}{dt}\sin(2\theta_R) \end{bmatrix} \begin{bmatrix} i_\alpha \\ i_\beta \end{bmatrix}$$

Solving for the time rate of change in the current $[di\alpha/dt\ di\beta/dt]$ as a function of the input voltage yields equation (3), which is the state space form of the permanent magnet (PM) model of the motor 100 with saliency.

$$\begin{bmatrix} \frac{di_\alpha}{dt} \\ \frac{di_\beta}{dt} \end{bmatrix} = \frac{1}{L_0^2 - \Delta L^2} \begin{bmatrix} L_0 + \Delta L\cos(2\theta_R) & \Delta L\sin(2\theta_R) \\ \Delta L\sin(2\theta_R) & L_0 - \Delta L\cos(2\theta_R) \end{bmatrix} \quad \text{Equation (3)}$$

$$\left\{ \begin{bmatrix} V_\alpha \\ V_\beta \end{bmatrix} - R_S \begin{bmatrix} i_\alpha \\ i_\beta \end{bmatrix} - \lambda_M \frac{d\theta_R}{dt} \begin{bmatrix} -\sin(\theta_R) \\ \cos(\theta_R) \end{bmatrix} - \right.$$

$$\left. \begin{bmatrix} -2\Delta L\frac{d\theta_R}{dt}\sin(2\theta_R) & 2\Delta L\frac{d\theta_R}{dt}\cos(2\theta_R) \\ 2\Delta L\frac{d\theta_R}{dt}\cos(2\theta_R) & 2\Delta L\frac{d\theta_R}{dt}\sin(2\theta_R) \end{bmatrix} \begin{bmatrix} i_\alpha \\ i_\beta \end{bmatrix} \right\}$$

The position of the rotor 104 relative to the stator 102 is determined by injecting a signal into the motor 100, which induces a current in the windings 110 in the stator 102. In the following embodiments, the injected signal is a high frequency signal. Because the rotor 104 is not moving relative to the stator 102 when the signal is injected, equation (3) simplifies to equation (4) as follows:

$$\begin{bmatrix} \frac{di_\alpha}{dt} \\ \frac{di_\beta}{dt} \end{bmatrix} = \quad \text{Equation (4)}$$

$$\frac{1}{L_0^2 - \Delta L^2} \begin{bmatrix} L_0 + \Delta L\cos(2\theta_R) & \Delta L\sin(2\theta_R) \\ \Delta L\sin(2\theta_R) & L_0 - \Delta L\cos(2\theta_R) \end{bmatrix} \begin{bmatrix} V_\alpha \\ V_\beta \end{bmatrix}$$

Because the speed of the rotor 104 is zero $$\left( \text{e.g.} \frac{d(\theta_R)}{dt} = 0 \right)$$

and the stator resistance $R_S$ acts as a low pass filter, there is a minimal voltage drop across the resistance in the stator 102 at high frequency. Based on the foregoing, the stator voltages represented in the static alpha/beta coordinate system, FIG. 2, are related to the stator voltages represented in the arbitrary M/N coordinate system by the following Park transformation:

$$\begin{bmatrix} V_M \\ V_N \end{bmatrix} = \begin{bmatrix} \cos(\theta) & \sin(\theta) \\ -\sin(\theta) & \cos(\theta) \end{bmatrix} \begin{bmatrix} V_\alpha \\ V_\beta \end{bmatrix} \quad \text{Equation (5)}$$

where $V_M, V_N$ are the stator motor voltages in the arbitrary M/N coordinate system. When the rotor 104 is moving at a constant speed, the time rate of change of the current in the static alpha/beta coordinate system can be translated to the arbitrary M/N coordinate system using the same Park transformation as used in equation (5) to yield the relationship of equation (6):

$$\begin{bmatrix} \frac{di_M}{dt} \\ \frac{di_N}{dt} \end{bmatrix} = \begin{bmatrix} \cos(\theta) & \sin(\theta) \\ -\sin(\theta) & \cos(\theta) \end{bmatrix} \begin{bmatrix} \frac{di_\alpha}{dt} \\ \frac{di_\beta}{dt} \end{bmatrix} \quad \text{Equation (6)}$$

Based on the foregoing equations of transformed voltages and current relationships, the high frequency model of the motor 100 is given by equation (7) as follows:

$$\begin{bmatrix} \frac{di_M}{dt} \\ \frac{di_N}{dt} \end{bmatrix} = \frac{1}{L_0^2 - \Delta L^2} \begin{bmatrix} L_0 + \Delta L\cos(2(\theta_R - \theta)) & \Delta L\sin(2(\theta_R - \theta)) \\ \Delta L\sin(2(\theta_R - \theta)) & L_0 - \Delta L\cos(2(\theta_R - \theta)) \end{bmatrix} \begin{bmatrix} V_M \\ V_N \end{bmatrix} \quad \text{Equation (7)}$$

By evaluating the high frequency motor model in the arbitrary M/N coordinate system, it can be seen that the dynamics are related to the error between the actual rotor angle $\theta_R$ and the angle $\theta$ denoting the location of the arbitrary M/N coordinate system. By picking a proper input voltage wave form and monitoring the time rate of change of the current, the position of the rotor 104 can be determined. The embodiments described herein use a square wave for injection into the motor, which has many advantages over other waveforms. For example, the use of a square wave does not require demodulation as is required with a sinusoidal wave. An embodiment of a square wave is shown by equation (8) as follows:

$$V_M = V_{SQ} \cdot sgn(\sin(\omega_{SQ} t)) \quad \text{Equation (8)}$$

where: $V_M$ is the voltage in the M direction of the M/N reference frame; $V_{SQ}$ is the voltage magnitude of the square wave; sgn(•) is a sign function; sin(•) is a sine function; $\omega_{SQ}$ is the square wave frequency; and t is time. The square wave of equation (8) is substituted into equation (7), which yields the high frequency motor model of equation (9) as follows:

$$\begin{bmatrix} \frac{di_M}{dt} \\ \frac{di_N}{dt} \end{bmatrix} = \frac{V_{SQ} \cdot sgn(\sin(\omega_{SQ} t))}{L_0^2 - \Delta L^2} \begin{bmatrix} L_0 + \Delta L\cos(2(\theta_R - \theta)) \\ \Delta L\sin(2(\theta_R - \theta)) \end{bmatrix} \quad \text{Equation (9)}$$

Approximating the time rate of change in current as $di/dt \approx \Delta i/\Delta t$ the change in current can be approximated by equation (10) as follows:

$$\begin{bmatrix} \Delta i_M \\ \Delta i_N \end{bmatrix} \approx \frac{V_{SQ} \cdot \Delta T \cdot sgn(\sin(\omega_{SQ} t))}{L_0^2 - \Delta L^2} \begin{bmatrix} L_0 + \Delta L\cos(2(\theta_R - \theta)) \\ \Delta L\sin(2(\theta_R - \theta)) \end{bmatrix} \quad \text{Equation (10)}$$

As a result, the current change in the N direction can be written as shown by equation (11) as follows:

$$\Delta i_N \approx \frac{V_{SQ} \cdot \Delta T \cdot \Delta L \cdot sgn(\sin(\omega_{SQ} t))}{L_0^2 - \Delta L^2} \sin(2(\theta_R - \theta)) \quad \text{Equation (11)}$$

The rotor angle $\theta_R$ can be estimated from the equation (11) by using the equation (12) as follows:

$$\theta_R \approx \frac{1}{2} \sin^{-1}\left( \frac{\Delta i_N \cdot (L_0^2 - \Delta L^2)}{V_{SQ} \cdot \Delta T \cdot \Delta L \cdot sgn(\sin(\omega_{SQ} t))} \right) + \theta \quad \text{Equation (12)}$$

Equation (12) is computationally intensive and requires knowledge of the inductance variation of the motor 100, FIG. 1, as the position of the rotor 104 changes relative to the stator 102. As stated above, in a salient motor, the inductances of the windings 110 change with the position of the rotor 104.

Figure 3:
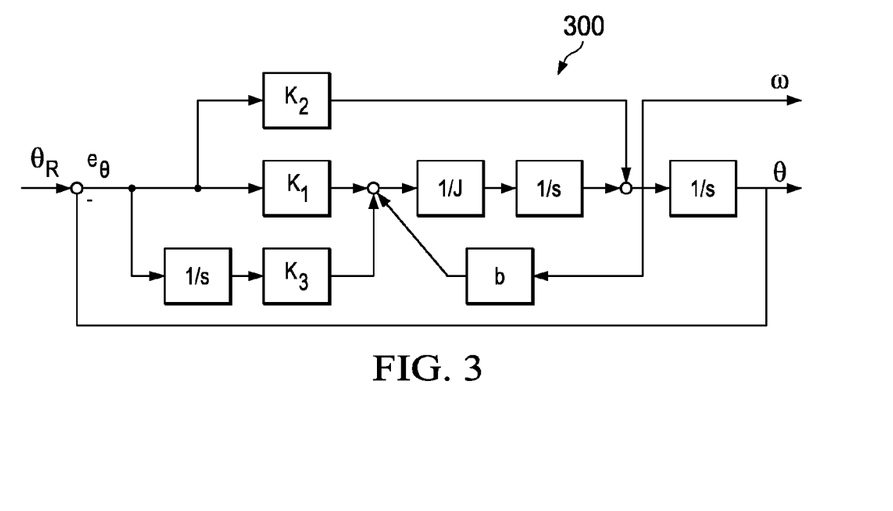
FIG. 3 is a block diagram of a Luenberger observer.

Another approach to determine rotor position, other than using equation (12), is to use a Luenberger observer 300 as shown in FIG. 3 and let a system that controls the motor 100, FIG. 1, drive the error $e_\theta$ between the rotor angle $\theta_R$, FIG. 2, and the arbitrary angle $\theta$ to zero. When the Luenberger observer 300 drives the error $e_\theta$ to zero, the arbitrary angle $\theta$ is equal to the rotor angle $\theta_R$, and thus the output of the Luenberger observer ($\theta$) is the rotor angle $\theta_R$.

The constants K1, K2, and K3 are observer gains that are set so that the poles of the Luenberger observer 300 are stable. Mathematically, the poles of the transfer function of the Luenberger observer 300 are analyzed to make sure that they are in the left half plane of the s-domain, which assures stability. Because the Luenberger observer 300 is stable, the error $e_\theta$ is guaranteed to go to zero in a finite amount of time. The term b is a viscous damping term that represents any resistive torque in the motor 100, FIG. 1, wherein the torque is proportional to angular velocity $\omega$. The term J is the rotational inertia experienced by the motor 100 and is derived from the rotor shaft and any drive train in a conventional manner. Using small angle approximations and the Luenberger observer 300, the error $e_\theta$ can be written as shown by equation (13) as follows:

$$e_\theta = \theta_R - \theta \approx \frac{L_0^2 - \Delta L^2}{2 \cdot V_{SQ} \cdot \Delta T \cdot \Delta L \cdot sgn(\sin(\omega_{SQ} t))} \Delta i_n = K \frac{\Delta i_N}{sgn(\sin(\omega_{SQ} t))} \quad \text{Equation (13)}$$

where the constant K is defined as $$K = \frac{L_0^2 - \Delta L^2}{2 \cdot V_{SQ} \cdot \Delta T \cdot \Delta L}.$$

By using the Luenberger observer 300, the system is guaranteed to converge if the poles of the observer are correctly designed. It is noted that the inductance variance is very small, so the term ΔL is a small value and will not have a very significant effect on the value of K. In some embodiments, the inductance is measured as a function of rotor angle $θ_R$, so that the value of ΔL is measured.

Figure 4:
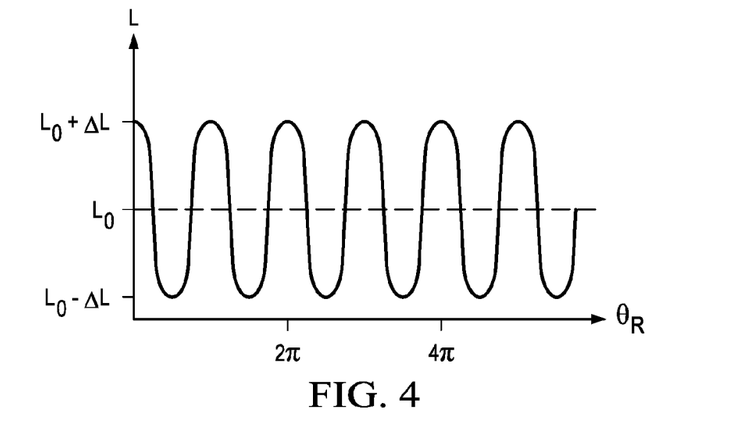
FIG. 4 is a graph showing the inductance of the motor of FIG. 1 as a function of the angle of the rotor.

The methods and circuits described above cannot determine the north/south orientation of the rotor 104 with respect to the magnetic field being generated by the permanent magnet and the voltage to the stator 102. Reference is made to FIG. 4, which is a graph showing the motor inductance L as a function of the rotor angle $θ_R$ of the rotor 104. The inductance L goes thru two periodic cycles for every one periodic cycle of the rotor angle $θ_R$. This relationship results in uncertainty as to the north-south orientation of the rotor 104. The methods and circuits described below determine the initial orientation of the rotor 104.

Figure 5:
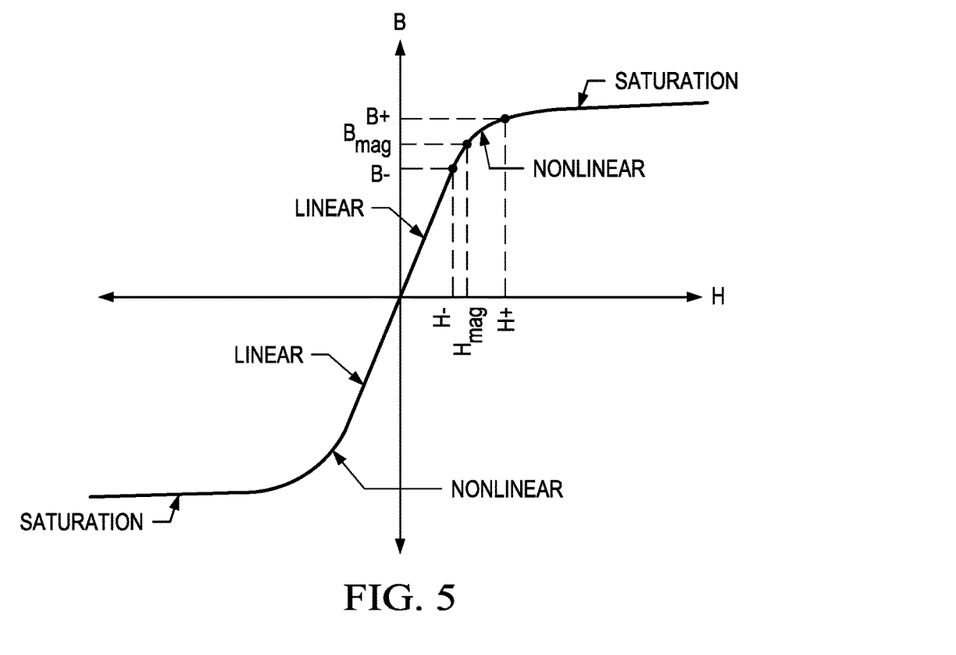
FIG. 5 is a graph showing the magnetic flux as a function of magnetic field intensity in the motor of FIG. 1.

The magnetic flux density B and the magnetic field strength H are used to determine the orientation of the rotor 104. The relationship between magnetic flux density B with units of tesla, (1 tesla=1 Wb/m²) and magnetic field strength H with units of A/m is shown by the graph of FIG. 5. The graph shows how the magnetic flux density B varies as a function of magnetic field strength H. It is noted that the flux density B is proportional to voltage (Wb=V·sec) and that the field strength H is proportional to current. As shown by the graph, there is a linear region, a nonlinear region, and a saturation region for both positive and negative magnetic field strengths H. For permanent magnet motors, the operating point on the B-H curve is determined by the flux generated by these magnets, as shown by the point ($H_{mag}$, $B_{mag}$). The exact location of the operating point depends on the relative field strength of the magnet compared to the overall field strength of the core of the rotor 104, FIG. 1, over the entire range of operating current.

An algorithm is used to determine the north-south orientation of the rotor 104 with respect to the motor stator windings 110 based on the non-linear relationship between the magnetic flux density B and the magnetic field strength H. The above-described square wave of equation (8) is applied to the motor stator windings 110 in an arbitrary M-direction. In some embodiments, the magnitude of the square wave, $V_{SQ}$, is chosen so that it produces a magnetic field large enough to drive the stator 102 into saturation via the resultant current in the stator windings 110.

FIG. 5 also shows the minimum and maximum points on the B-H curve during the square wave voltage $V_M$ excitation when a positive voltage drives the stator 102, FIG. 1, into saturation. In FIG. 5, the term $H_+$ is the magnetic field strength achieved during the positive portion of the square wave $V_M$ and the term $H_-$ is the magnetic field strength achieved during the negative portion of the square wave $V_M$. The term $B_+$ is the flux density achieved during the positive portion of the square wave $V_M$ and the term $B_-$ is the flux density achieved during the negative portion of the square wave $V_M$. As described in greater detail below, the change in voltage due to the square wave $V_M$ causes a change in current which produces variations in the magnetic field strength. By measuring the current levels in the stator 102, the north/south orientation of the rotor 104 is readily determined.

When a positive voltage drives the stator 102 into the saturation region, it is assumed that the magnetic field strength $H_+$ produced by the current in the stator windings 110 is aligned with the magnetic field $H_{MAG}$ produced by the permanent magnet in the rotor 104. The difference between the positive and negative flux densities ($B_+$ and $B_-$) during the square wave voltage $V_M$ injection and the flux density $B_{MAG}$ due to the permanent magnet in the rotor 104 are the same. However, the difference between the positive and negative magnetic field strengths ($H_+$ and $H_-$) and the field strength $H_{MAG}$ due to the permanent magnet in the rotor 104 are not the same because the operating point is near the nonlinear portion of the B-H curve. The resulting magnetic field strengths are described by equation (14) as follows:

$$H_+ - H_{mag} > H_{mag} - H_-$$ Equation (14)

Because the magnetic field strength H is proportional to current in the windings 110 and a positive voltage is assumed to generate a positive current in the windings 110, equation (14) becomes equivalent to $I_+ > -I_-$. More specifically, the magnitude of the current achieved during the positive portion of the square wave $V_M$ is greater than the magnitude of the current achieved during the negative portion of the square wave $V_M$ when the magnetic fields are aligned.

Figure 6:
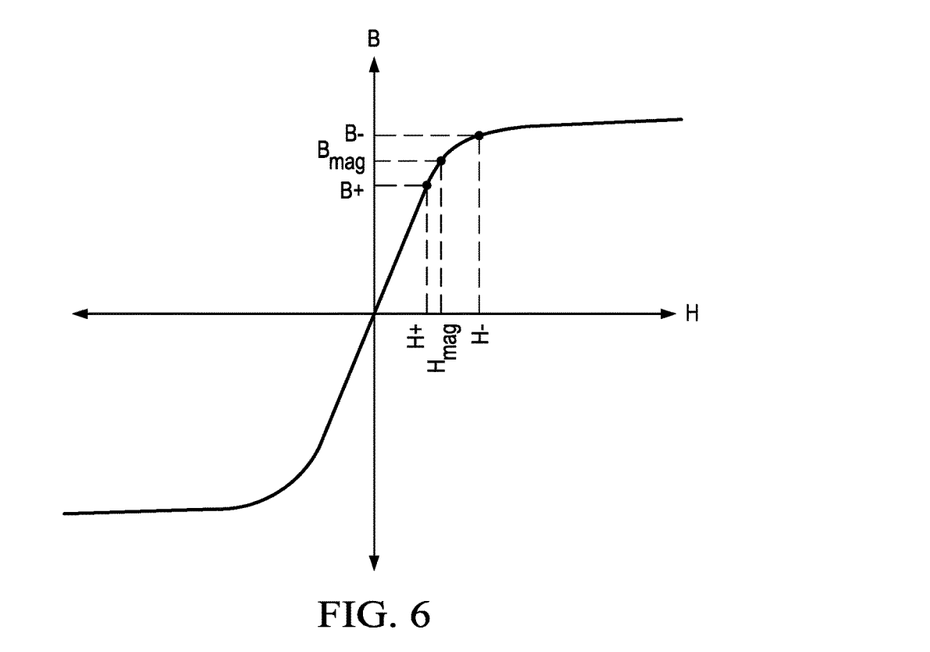
FIG. 6 is a graph showing another embodiment of the magnetic flux as a function of magnetic field intensity of the motor of FIG. 1.

FIG. 6 shows the minimum and maximum points on the B-H curve during the excitation by the square wave $V_M$ when a negative voltage drives the stator 104 into saturation. When a negative voltage drives the stator 102, FIG. 1, into the saturated region, it is assumed that the magnetic field produced by the current in the stator windings 110 is opposed to the magnetic field $H_{MAG}$ produced by the permanent magnet in the rotor 104. The difference between the positive and negative flux densities (B+ and $B_-$) during the square wave $V_M$ and the flux density $B_{MAG}$ due to the permanent magnet is the same. However, the difference between the positive and negative field strengths ($H_+$ and $H_-$) and the field strength $H_{MAG}$ due to the permanent magnet is not the same because the operating point is near the nonlinear portion of the B-H curve. The resulting magnetic field strengths are described by equation (15) as follows:

$$H_- - H_{MAG} > H_{MAG} - H_+$$ Equation (15)

As described above, the magnetic field strength H is proportional to the current flow in the windings 110, FIG. 1, and no current results from the magnetic field $H_{MAG}$ produced by the permanent magnets. Therefore, equation (15) is equivalent to $-I_- > I_+$. This current relationship implies that the magnitude of the current achieved during the negative portion of the square wave $V_M$ is greater than the magnitude of the current achieved during the positive portion of the square wave $V_M$ when the magnetic fields are opposed.

The behavior of the current magnitude for different orientations of the magnet in the rotor 104 with respect to the stator windings 110 is used to determine the orientation of the rotor 104. In some embodiments, the average current value during the voltage square wave $V_M$ is calculated. For the case when the average current is greater than zero, the rotor 104 is aligned with the stator 102 because $I_+ + I_- > 0$. For the case when the average current is less than zero, the rotor 104 is opposed to the stator 102 because $I_+ + I_- < 0$. In the case where the rotor 104 is opposed to the stator 102, the rotor angle $θ_R$ should be adjusted by π. By combining this algorithm with the Luenberger observer algorithm described above, the absolute initial electrical rotor angle $θ_R$ is determined.

Figure 7:
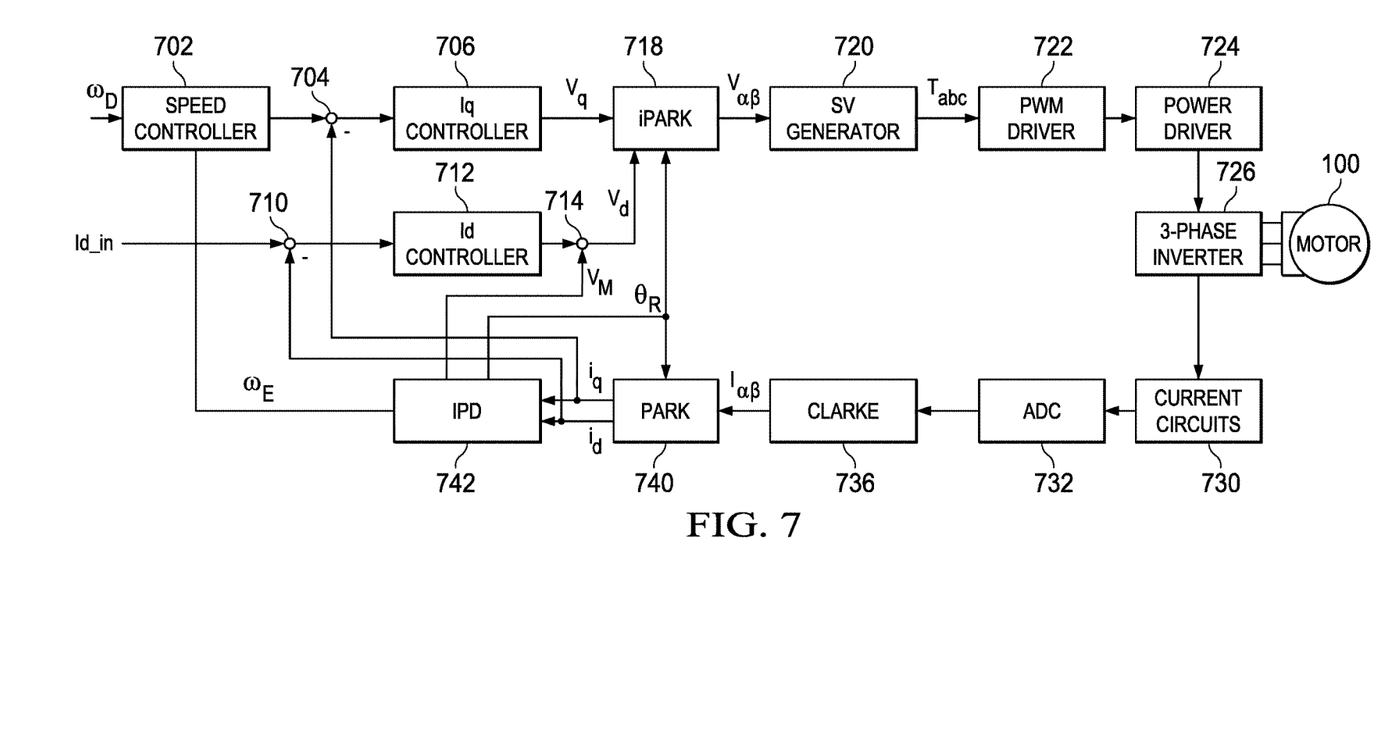
FIG. 7 is a block diagram of an embodiment of a field oriented controller for the motor of FIG. 1.

The integration of the initial position detection (IPD) described above into a conventional field oriented control (FOC) controller 700 is shown by the block diagram in FIG. 7. The controller 700 includes a speed controller 702 that receives a speed input $ω_D$ from a user or external source. The speed controller 702 compares the speed input $ω_D$ to the speed ω output from the Luenberger observer 300, FIG. 3. The output of the speed controller 702 is a reference current in the q axis that is reduced by the measured current in the q axis by an adder 704. The output of the adder 704 is an error signal that is input to an $I_q$ controller 706 that generates the q axis voltage $V_q$. An input $I_{d\_in}$ is also received from an external source and is reduced by the measured current $I_d$ by an adder 710. The output of the adder 710 is an error signal that is input to an $I_d$ controller 712 to generate a driving voltage that in conventional controllers would be the d axis voltage $V_d$. In the controller 700, the output of the $I_d$ controller 712 has the square wave $V_M$ added to it by an adder 714. The output of the adder 714 is the voltage $V_d$.

The voltages $V_q$ and $V_d$ are input to a conventional inverse Park transform device 718 that generates the voltages in the alpha/beta domain $V_{\alpha\beta}$, which are input to a space vector generator 720. The space vector generator 720 generates a three phase driving signal for the motor 100. The output of the space vector generator 720 is input to a pulse width modulator (PWM) driver 722. In some embodiments, the PWM driver 722 is a hardware device. The PWM driver 722 outputs PWM signals that are amplified by a power driver 724, which are then transmitted to a three phase inverter 726 to drive the motor 100.

Current sensors 730 monitor the current into the motor 100. In some embodiments, one of the three phases is monitored and in other embodiments, two or three phases are monitored. The current values are analog values and are input to an analog to digital converter (ADC) 732, which outputs digital values representing the measured currents. The digital values of the current are input to a Clarke transform device 736 that outputs the alpha/beta domain currents $I_{\alpha\beta}$ or representations of the currents $I_{\alpha\beta}$. The currents $I_{\alpha\beta}$ are input to a Park transform device 740 that performs a Park transform as described above. The rotor angle $\theta_R$ is input to the Park transform 740 as described below. Prior to the rotation of the rotor 104, FIG. 1, the initial position of the rotor 104 is input to the Park transform device 740.

The Park transform device 740 generates the currents $i_q$ and $i_d$, or values representing the currents, as described above. The Park transform device 740 uses the rotor angle $\theta_R$ in determining or calculating the currents $i_q$ and $i_d$. The output currents of the Park transform device 740 are input to an initial position detector (IPD) 742. The IPD 742 generates the rotor angle $\theta_R$ and the velocity w per the Luenberger observer 300, FIG. 3. The Luenberger observer 300 operates on the error signal $e_\theta$ defined by equation (13). Thus, it operates on the $\Delta i_N$ current value, which is the change in current level in the $i_N$ direction due to the square wave voltage $V_M$. As the Luenberger observer 300 drives the error signal $e_\theta$ to zero, the angle $\theta$ goes to $\theta_R$, the $i_M$ axis aligns with the $i_d$ axis and the $i_N$ axis aligns with the $i_q$ axis.

Figure 8:
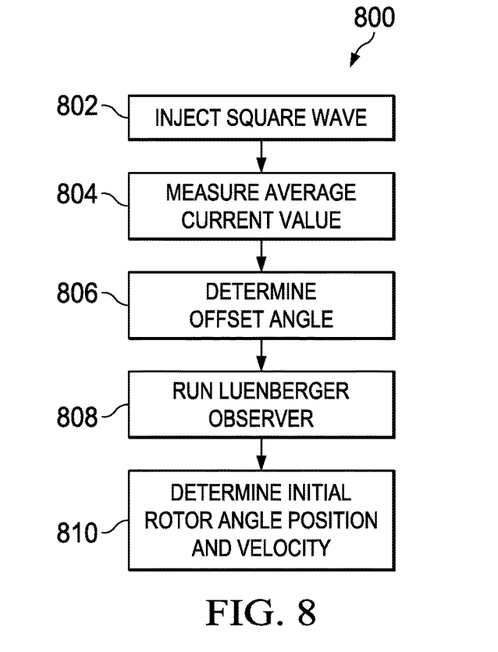
FIG. 8 is a flowchart describing an embodiment of the operation of the motor of FIG. 1.

An embodiment of the descriptions related to determining the rotor position and velocity are described by the flowchart 800 of FIG. 8. In block 802, the square wave $V_M$ is injected into the motor 100. In block 804, the average current input to the motor 100 is measured. As described above, the average input current is used to determine the orientation of the rotor 104 or the north/south direction of the magnet in the rotor 104. In block 806, the offset angle of the rotor 104 is determined. In block 808, the Luenberger observer 300, FIG. 3, is run as described above. In block 810, the initial rotor angle, position, and velocity are determined based on the Luenberger observer 300.

Figure 9:
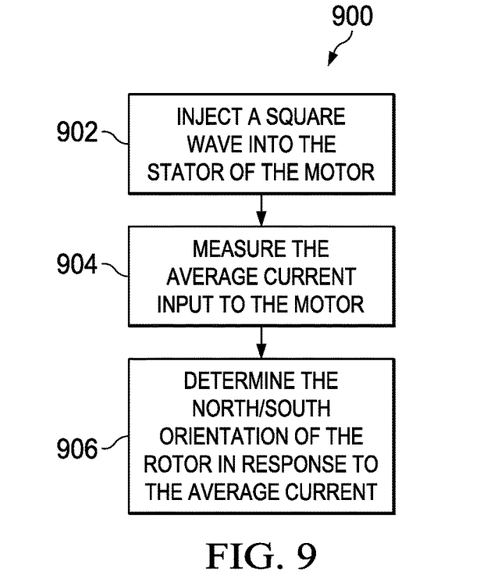
FIG. 9 is a flowchart describing an embodiment of the operation of the motor of FIG. 1.

An embodiment for determining the rotor position is shown by the flowchart 900 of FIG. 9. In Step 902, a square wave is injected into the stator 102 of the motor 100. In step 904, the average current input to the motor 100 is measured. In step 906, the north/south orientation of the rotor 104 in response to the average current is determined.

While illustrative and presently preferred embodiments of integrated circuits have been described in detail herein, it is to be understood that the inventive concepts may be otherwise variously embodied and employed and that the appended claims are intended to be construed to include such variations except insofar as limited by the prior art.

What is claimed is:

1. A motor controller comprising:
   a square wave voltage generator that generates a square wave voltage;
   an input that receives an external current;
   a controller that generates a first voltage in response to receiving an error signal;
   first adding circuitry that adds the square wave voltage to the first voltage to produce a drive voltage that is connectable to the stator windings of a motor;
   a current monitor that monitors an input current to the motor as a result of the square wave voltage; and
   a device that determines the position of the rotor based on the monitored input current;
   wherein the error signal is based on the difference between the external current and a current signal based on the monitored input current.

2. The motor controller of claim 1, wherein the device that determines the position of the rotor runs a Luenberger observer.

3. The motor controller of claim 1, further comprising an integration device that integrates velocity to determine rotor position.

4. The motor controller of claim 3, wherein the integration device is in a Luenberger observer.

5. The motor controller of claim 1, comprising second adding circuitry that determines a difference between the external current and the current signal based on the monitored input current and outputs the difference as the error signal to the controller.

6. The motor controller of claim 1, comprising an analog to digital converter (ADC) that receives the monitored input current and outputs a digital signal representing the monitored input current.

7. The motor controller of claim 6, comprising a Clarke transform device that performs a Clark transform on the digital signal.

8. The motor controller of claim 7, wherein the Clarke transform device outputs alpha and beta domain current signals based on the digital signal.

9. The motor controller of claim 7, comprising a Park transform device that receives an output of the Clarke transform device and performs a Park transform on the output of the Clarke transform device, wherein the Park transform device outputs the current signal based on the monitored input current.

10. The motor controller of claim 1, wherein the square wave voltage generator is part of the device for determining the position of the rotor.

11. A method of determining the position of a rotor in a motor, the method comprising:
    injecting a square wave into the stator of the motor;
    measuring the average current input to the motor; and
    determining the north/south orientation of the rotor in response to the average current by comparing the average current flowing in a first direction to the average current flowing in a second direction opposite the first direction.

12. The method of claim 11, further comprising:
running a Luenberger observer in response to the measured current; and
determining the position of the rotor in response to the Luenberger observer.

13. The method of claim 12, further comprising determining the velocity of the rotor in response to the Luenberger observer.

14. The method of claim 11, comprising:
determining that the rotor is aligned with the stator when the average current is determined to be greater than zero; and
determining that the rotor is opposed to the stator when the average current is determined to be less than zero.

15. A motor controller comprising:
a square wave voltage generator that generates a square wave voltage;
adding circuitry that adds the square wave voltage to a first voltage to produce a drive voltage that is connectable to the stator windings of a motor;
a current monitor that monitors an input current to the motor as a result of the square wave voltage; and
a Luenberger observer that operates on the monitored input current a to determine rotor position, wherein the Luenberger observer applies a plurality of observer gains to an error of a rotor angle, the observer gains being selected so that poles of the Luenberger observer are in the left half plane of an s-domain.

* * * * *